G. T. WILLSON.
SPEED INDICATOR.
APPLICATION FILED JULY 25, 1914.
1,150,088.
Patented Aug. 17, 1915.
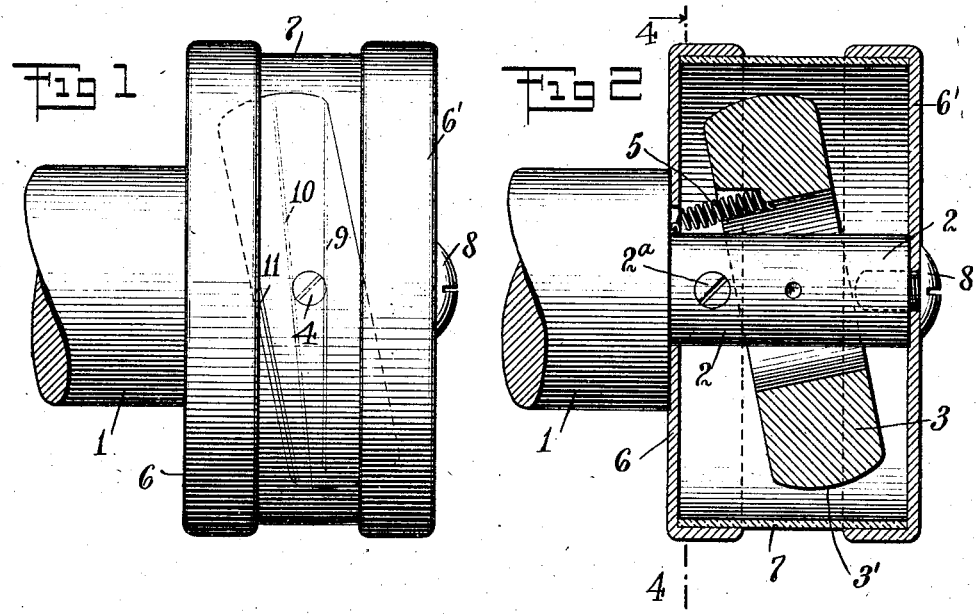
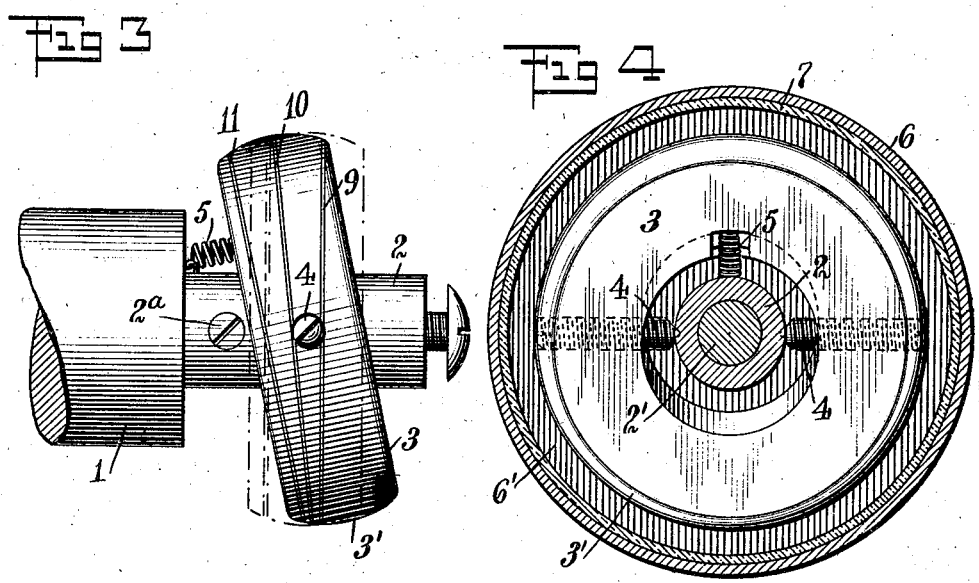
Witnesses:
Inventor
George T. Willson
By his Attorneys

UNITED STATES PATENT OFFICE.

GEORGE T. WILLSON, OF POUGHKEEPSIE, NEW YORK, ASSIGNOR TO THE DE LAVAL SEPARATOR COMPANY, OF NEW YORK, N. Y., A CORPORATION OF NEW JERSEY.

SPEED-INDICATOR.

1,150,088.  Specification of Letters Patent.  Patented Aug. 17, 1915.

Application filed July 25, 1914. Serial No. 853,243.

*To all whom it may concern:*

Be it known that I, GEORGE T. WILLSON, a citizen of the United States, residing at Poughkeepsie, Dutchess county, State of New York, have invented certain new and useful Improvements in Speed-Indicators, of which the following is a full, clear, and exact description.

My invention relates to an improvement in speed indicators and has for its object to produce a simple and inexpensive speed indicator for giving a visual indication of the speed of a rotating shaft.

It further has for its object to provide an indicator which is suitable for indicating to the eye the speed at which cream separators and other similar apparatus are operated.

The following is a description of an embodiment of my invention, reference being had to the accompanying drawings, in which—

Figure 1 is a side elevation of the complete speed indicator. Fig. 2 is a vertical central section of the same. Fig. 3 shows the speed indicator with the casing removed. Fig. 4 is a transverse section on the line 4—4, Fig. 2.

Referring more particularly to the drawings 1 indicates the shaft whose speed is to be measured, the same being provided with an extension 2 which may be a sleeve secured by a set screw 2ª to a suitable projection 2′ thereon.

3 is a ring shaped member having on its outer periphery a spherical surface 3′, and secured to the extension 2 by pivot screws 4—4 in line with the axis of the shaft 1, so as to be capable of moving about an axis passing the shaft axis and at right angles thereto.

5 is a spring, one end of which is secured to the ring member 3 and the other end of which is secured to the shaft 1.

Surrounding the ring member is a casing made up of two cup shaped members 6—6′ which fit over the ends of a transparent cylinder 7 and are held in place by a screw 8. The spherical surface of the ring shaped member is provided with a plurality of bands 9—10—11 which encircle the ring member and lie in a corresponding number of planes inclined to one another and which preferably do not intersect within the body of the ring member. These bands are of distinctive colors such for instance as red, white and blue respectively. From the foregoing it will be seen that the ring 3 may be in a plane at right angles to the axis of the shaft or may be drawn away from said plane by the spring.

The operation of the device is as follows: When the parts are at rest the spring 5 holds the ring 3 in the position shown in Fig. 2. It is of such strength as to continue to hold it in that position until the speed of rotation approaches that desired for the shaft 1. While in this position, the band 9 appears to run true while the bands 10 and 11 wabble and are indistinct. When the desired speed is reached, centrifugal action causes the ring member to tilt so as to bring the band 10 into a position at right angles to the axis, whereupon the band 10 runs true and the bands 9 and 11 wabble. If the speed is high, the band 11 is brought into a plane at right angles to the shaft and runs true and bands 9 and 10 wabble.

In making these indicators the parts may be assembled except for the transparent ring 7 and the head 6′. The ring has previously been given a base color. The shaft 1 is then run at a speed slightly below normal and the surface of the ring member touched with a brush containing the color for the band 9. The speed is then increased to normal and the band 10 marked thereon in the corresponding manner with its color. Afterward the device is speeded above normal and the band 11 is correspondingly marked with its color. With an automatic device for bringing the shaft to the desired speeds, the marking process can be quickly carried out. It is preferable to have three marking bands although the single band 10 alone will indicate the proper speed.

As will be evident to those skilled in the art, my invention permits of various modifications without departing from the spirit thereof or the scope of the appended claims.

What I claim is:

1. In a speed indicator, the combination of a rotatable shaft, a member pivotally mounted on said shaft, means normally tending to pull said member out of the plane perpendicular to said shaft, there being a band marked on said member so as to be in a plane perpendicular to the axis of said shaft when the shaft is revolving at a given speed, said band being normally out of said perpendicular plane when said shaft is at rest and serving to indicate said given speed when the shaft is revolved so as to bring said line into a plane perpendicular to the axis thereof.

2. In a speed indicator, the combination of a rotatable shaft, a ring shaped member surrounding said shaft and pivotally mounted thereon, means normally tending to pull said member out of the plane perpendicular to said shaft, there being a band marked on said member so as to be in a plane perpendicular to the axis of said shaft when the shaft is revolving at a given speed, said band being normally out of said perpendicular plane when said shaft is at rest and serving to indicate said given speed when the shaft is revolved so as to bring said line into a plane perpendicular to the axis thereof.

3. In a speed indicator, in combination, a shaft, a ring pivotally mounted on said shaft so as to rotate relatively to said shaft about a line at right angles to the axis of said shaft and capable of being moved so as to lie in a plane at right angles to said axis, means tending to move said ring away from said plane, there being a plurality of colored bands on the surface of said ring, said bands lying in different planes which are at an angle to one another and parallel to the axis upon which said ring rotates relatively to said shaft.

4. In a speed indicator, in combination, a shaft, a ring pivotally mounted on said shaft so as to rotate relatively to said shaft about a line at right angles to the axis of said shaft and capable of being moved so as to lie in a plane at right angles to said axis, means tending to move said ring away from said plane, there being a plurality of colored bands on the surface of said ring, said bands lying in different planes which are at an angle to one another and parallel to the axis upon which said ring rotates relatively to said shaft, the planes of said bands intersecting outside the body of said ring.

5. In a speed indicator, the combination of a rotatable shaft, a member pivotally mounted on said shaft, the axis of said member intersecting the axis of said shaft and being at right angles thereto, means normally tending to pull said member out of the plane perpendicular to said shaft, there being a band marked on said member so as to be in a plane perpendicular to the axis of said shaft when the shaft is revolving at a given speed, said band being normally out of said perpendicular plane when said shaft is at rest and serving to indicate said given speed when the shaft is revolved so as to bring said line into a plane perpendicular to the axis thereof.

6. In a speed indicator, the combination of a rotatable shaft, a member pivotally mounted on said shaft, means normally tending to pull said member out of the plane perpendicular to said shaft, there being a band marked on said member so as to be in a plane perpendicular to the axis of said shaft when the shaft is revolving at a given speed, and a housing for said member having a window through which said band is visible when revolving in a plane at right angles to the axis of said shaft.

7. In a speed indicator, the combination of a rotatable shaft, a member pivotally mounted on said shaft, means normally tending to pull said member out of the plane perpendicular to said shaft, there being a band marked on said member so as to be in a plane perpendicular to the axis of said shaft when the shaft is revolving at a given speed, and a housing for said member having a window through which said band is visible when revolving in a plane at right angles to the axis of said shaft and said housing revolving with said shaft.

8. In a speed indicator, the combination of a rotatable shaft, a ring pivotally mounted on said shaft so as to rotate relatively to said shaft about a line at right angles to the axis of said shaft, means tending to move said ring away from the plane perpendicular to the axis of said shaft, there being a plurality of colored bands on the surface of said ring for indicating different corresponding speeds, said bands lying in different planes which are at an angle to one another and parallel to the axis upon which said ring rotates relatively to said shaft, each of said bands being normally out of said perpendicular plane when said shaft is at rest and serving to indicate the corresponding given speed when the shaft is rotated at that speed, and so located as to lie in a plane perpendicular to the shaft when the shaft revolves at the speed which corresponds thereto.

GEORGE T. WILLSON.

Witnesses:
CHARLES L. POWELL,
GRACE McCANN.